Aug. 24, 1954 — J. W. COX — 2,687,208
EGG WEIGHING APPARATUS
Original Filed April 5, 1946 — 5 Sheets-Sheet 1

INVENTOR.
John W. Cox,
BY
Cromwell, Greist & Warden
Attys.

Aug. 24, 1954          J. W. COX          2,687,208

EGG WEIGHING APPARATUS

Original Filed April 5, 1946          5 Sheets-Sheet 3

INVENTOR.
John W. Cox,
BY
Cromwell, Greist & Warden
ATTYS.

Aug. 24, 1954 — J. W. COX — 2,687,208
EGG WEIGHING APPARATUS
Original Filed April 5, 1946 — 5 Sheets-Sheet 4

INVENTOR.
John W. Cox,
BY Cromwell, Greist-Warden
ATTYS.

Patented Aug. 24, 1954

2,687,208

UNITED STATES PATENT OFFICE 2,687,208

EGG WEIGHING APPARATUS

John W. Cox, Chicago, Ill., assignor to General Package Corporation, a corporation of Delaware Original application April 5, 1946, Serial No. 660,003, now Patent No. 2,563,583, dated August 7, 1951. Divided and this application April 15, 1949, Serial No. 87,790

20 Claims. (Cl. 198—37)

This invention relates to an improved weighing or grading mechanism, particularly well adapted for use in the handling and packaging of eggs. The present application is a division of my copending application, Serial No. 660,003, filed April 5, 1946, now Patent 2,563,583, dated August 7, 1951.

The egg industry has recognized the need for mechanized egg rooms for grading eggs according to size and quality, particularly for the retail trade, and various weighing devices, conveyors, etc. have been devised. Some of the conveyor systems have gone into somewhat extensive use in the cartoning of eggs, but the weighing devices have not fitted into such system satisfactorily.

It is therefore a general object of the present invention to provide an improved, relatively inexpensive and thoroughly reliable and accurate mechanism for grading eggs or other objects by weight, in particular a mechanism which is suitable for association with an apparatus of the type shown and described in the above application.

A more specific object is to provide a completely automatic grading mechanism characterized by a conveyor which is adapted to intermittently advance a number of articles abreast, for example six eggs, inasmuch as this is the number packed abreast in a standard egg filler and flat assembly; which includes an individual weighing device for each article in a row so advanced adapted to come into weighing relation to that article only during a pause in the advance; which includes an electrically energizable weight indicating device; and which features an electrical operating and control circuit functioning to operate the conveyor, to insure the advance of the conveyor and the energization of said indicating device only during said pause, and to insure that the intermittent travel of the conveyor will continue in the absence of articles thereon to be graded.

The foregoing statements are indicative in a general way of the nature of the invention, but other and more specific objects will be apparent to those skilled in the art upon a full understanding of the construction and operation of the device.

A single embodiment of the invention is presented herein for purpose of illustration, but it will be appreciated that the invention is susceptible of incorporation in other modified forms coming equally within the scope of the appended claims.

Figure 1:
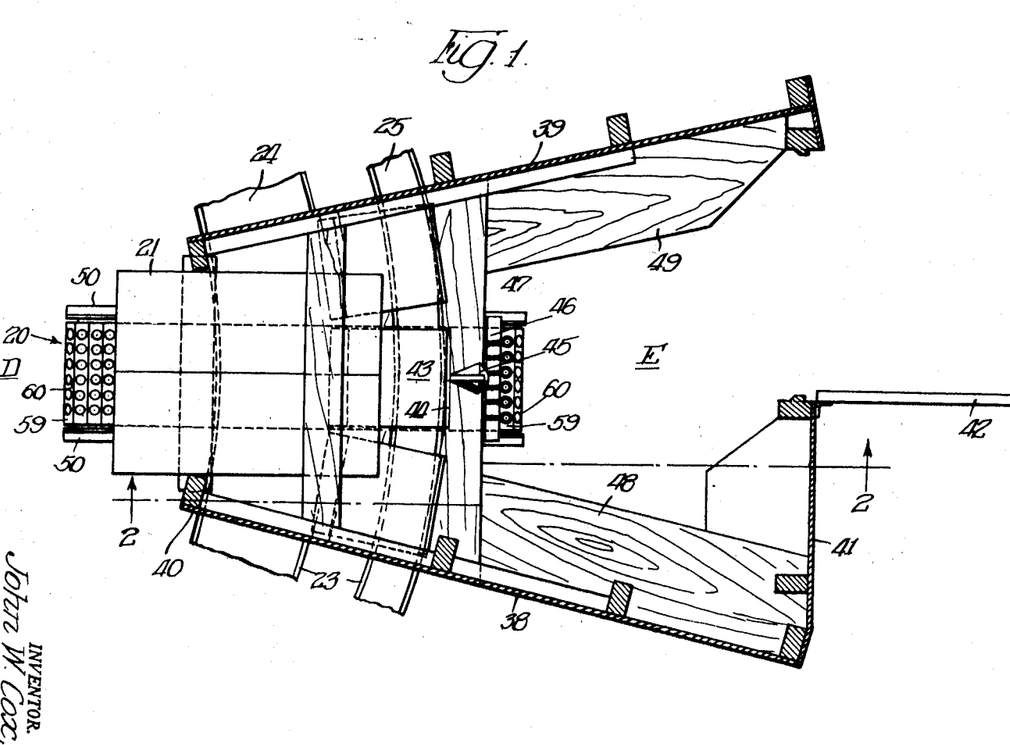
Fig. 1 is an enlarged fragmentary plan view of an apparatus according to the invention, showing a typical egg grading booth or station wherein a candler works, a plurality of such stations being disposed around the periphery of a conveyor mechanism, and the relationship of the present weighing mechanism to that structure.
Figure 2:
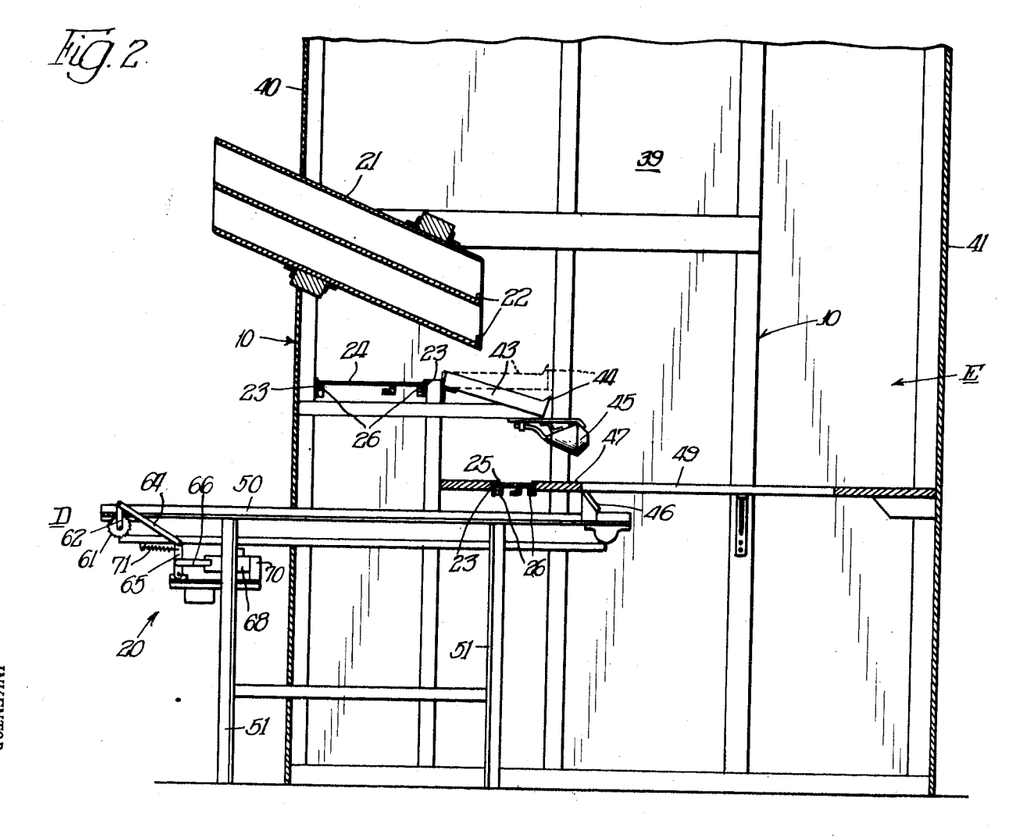
Fig. 2 is a cross-sectional view taken substantially along the line 2—2 of Fig. 1.
Figure 3:
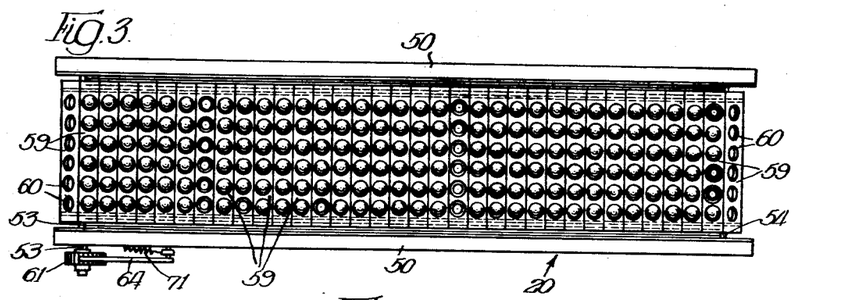
Fig. 3 is a plan view more clearly illustrating the loose egg conveyor which is a component of the structure shown in Figs. 1 and 2.

The structure of the egg handling apparatus, with which the present mechanism is associated for purpose of illustration, is illustrated in Figs. 1 and 2 of the drawings. It generally comprises a pair of rotating, circular, horizontal conveyors 24 and 25 about which are arranged the peripheral egg candling stations E, the latter being served with eggs to be graded and candled by the radial loose egg conveyors 20 of the present invention, which automatically advance a row of eggs to the candler in predetermined positions as required and automatically and simultaneously weigh each egg of the advanced row. Operators in the center of the annular shaped apparatus supply the radial conveyors with three dozen eggs at a time, preferably from a suitable conveyor (not shown) while eggs candled in the stations E are carried to a central packing station by the circular conveyors 24, 25 in cartons and flats and fillers for repacking.

A plurality of the loose egg carrying conveyor mechanisms 20 traverse the annular structure 10 in which the stations E are disposed at radially spaced positions, and the reference characters D denote loose egg loading stations at which such conveyor mechanisms are loaded with eggs. The loose eggs are discharged or removed from conveyor mechanism 20 for candling at station E.

As shown in Figs. 1 and 2, a plurality of packaging supply chutes 21 are provided, one for each station E, comprising a plurality of parallel chutes open at each end and inclined in the direction of station E. These chutes, like conveyor mechanisms 20, over which they are positioned, traverse parts of annular structure 10 to carry into station E requisite packaging materials such as cartons and filler and flat assemblies. As shown in Fig. 2, transversely extending stops or ledges 22 at the outer ends of chutes 21 hold packing materials from passing entirely through said chutes unless slightly lifted thereabove.

The annular structure 10, as illustrated in Figs. 1 and 2, includes a framework 23 providing a support for a pair of horizontal rotating, annular or ring conveyors. These operate in different horizontal, parallel planes, and are of different widths, the uppermost and the wider being indicated by numeral 24, and the lowermost and narrower being indicated by numeral 25.

Ring conveyors 24 and 25 may be made up of a series of arcuate sections of plywood rigidly fastened together in end-to-end relation to form complete circles, and are supported in sections of the framework 23 along at least their inner and outer edges by rollers 26, as illustrated in Fig. 2. Both of the conveyors are rotated in the same direction by appropriate drive means (not shown).

Referring particularly to Figs. 1 and 2, the operator's enclosure at each egg packing station E is defined by light excluding walls, namely, the front wall 40, a rear wall 41 and side walls 38 and 39. Doors 42 permit access to areas E.

A plurality of radially arranged filler and flat holding shelves 43 are hinged to framework 23 adjacent the outer periphery of ring conveyor 24 and normally tilt at a downward and outward angle relative to the conveyor 24. These shelves are upwardly swingable to the level of such conveyor, and each is provided with a transversely extending end stop 44 to prevent articles from sliding therefrom. A conventional egg candling light 45 is arranged medially of each station E, spaced above the discharge end of the loose egg conveyor mechanism 20 for that station. Preferably also spaced above conveyor 20 is an egg weight indicating means comprising a light panel 46, the structural details and purposes of which are more fully described hereinafter. A shelf area 47 is formed integral with framework 23, preferably substantially in the plane of annular conveyor 25, and side shelves 48 and 49 may, if desired, be placed at a convenient level adjacent side walls 38, 39.

Referring to Figs. 3 to 8, the loose egg conveyor 20 comprises a pair of parallel frame members 50 supported by upstanding legs 51. Mounted in opposed parallel relation in horizontal, parallel brackets 52 at opposite ends of frame 50, are a pair of shafts 53 and 54, having secured thereon the respective pairs of identical, spaced and aligned chain sprockets 55 (see Figs. 6 and 7) around which parallel endless chains 56 are trained. Chains 56 are made up of standard links 57, and at equally spaced intervals, bent lug links 58. There are thus provided a pair of endless chains in parallel relation. A plurality of conveyor slats 59 extend transversely of frame members 50 and are attached to chains 56 by rivets or links extending through the bent lug links 58, said slats lying in close side-by-side arrangement with their upper surfaces in coplanar order along the top of conveyor mechanism 20. Each slat 59 is provided with six aligned circular openings 60, each being of a size to pocket and hold an individual egg. Openings 60 are equally spaced longitudinally of each slat 59, and each slat 59 is positioned in such relation to each other slat that the egg holding openings are also equally spaced longitudinally of the conveyor. The openings in each direction are located in positions corresponding to the positions of eggs carried in conventional flats and fillers, so that eggs may be transferred from the flats and fillers directly to the conveyor. These positions are approximately one and three-quarters inches from center to center.

Figure 5:
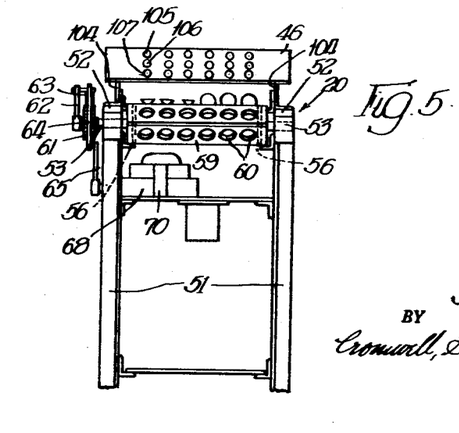
Fig. 5 is an end elevation of the loose egg conveyor, viewed from its discharge or unloading end.

As shown in Fig. 5, shaft 53 is of a length to extend outwardly of one bracket 52, and fixedly carries on its outer extension a ratchet wheel 61. Freely borne by the same shaft 53 is one end of an arm 62 carrying spring loaded pawl 63, and the opposite end of arm 62 is pivoted to one end of a link 64. At its other end link 64 is pivoted to an arm 65 which is pivotally mounted on frame 50. Medially of its length, arm 65 is connected by link 66 to the plunger 67 of a solenoid 68. A switch 70 is positioned forwardly of solenoid 68, its operating arm 69 (see Fig. 9) being engageable by solenoid plunger 67 in its most advanced position for a purpose to be described hereinafter. A coil tension spring 71, one end of which is connected to frame 50 and the other end to arm 65, serves to exert retractile force on the solenoid plunger.

Figure 6:
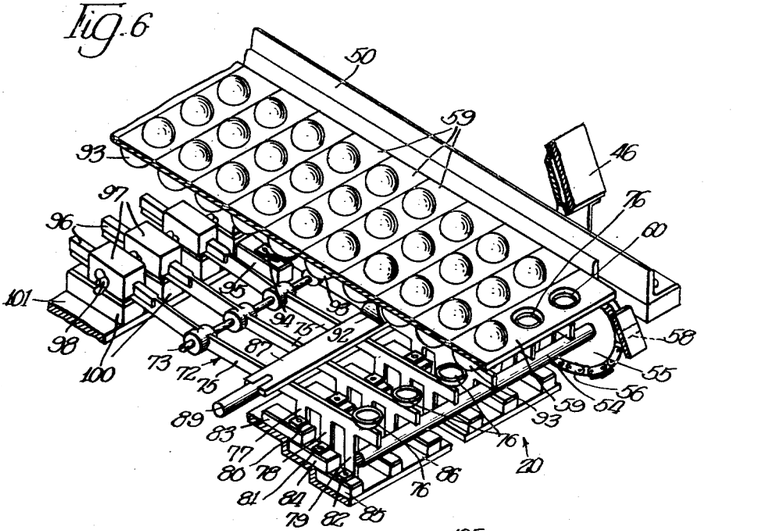
Fig. 6 is a fragmentary perspective view, partially broken away, showing one end of the loose egg conveyor, particularly the scale mechanism, the conveyor advance mechanism and associated parts.
Figure 7:
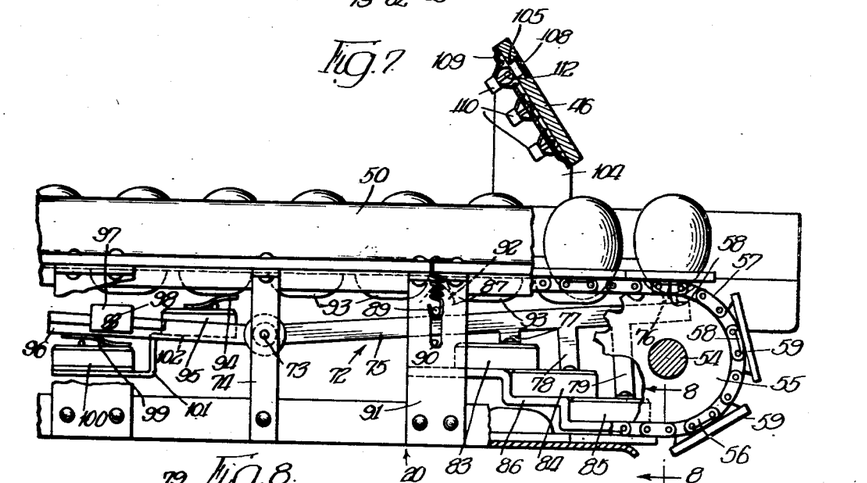
Fig. 7 is an enlarged fragmentary side elevation of one end of the loose egg conveyor, certain parts being broken away to better show the operating mechanism.
Figure 9:
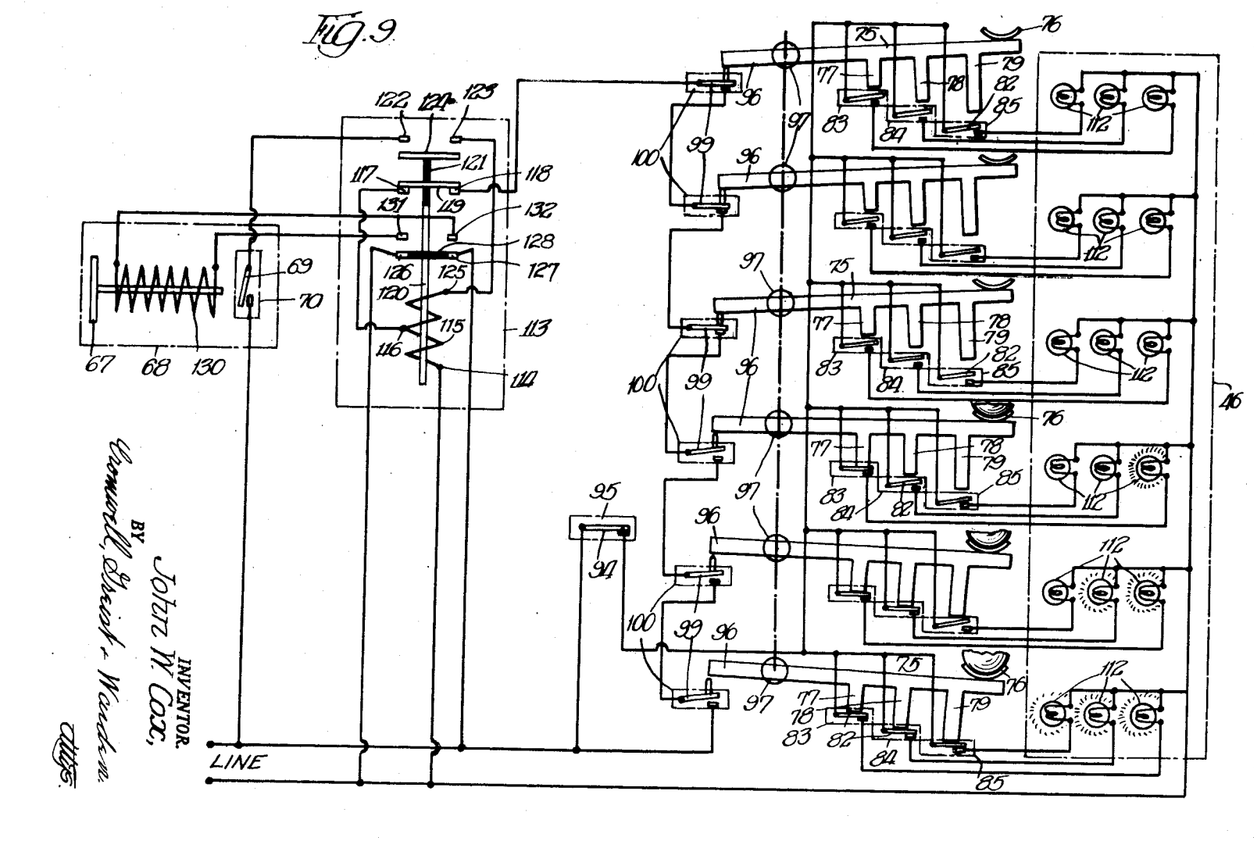
Fig. 9 is a wiring diagram illustrating certain of the electric circuits operative in the functioning of the above mechanism.

As particularly shown in Figs. 6 and 7, six weighing devices 72 are positioned between the upper and lower flights of egg conveyor mechanism 20 in horizontal alignment. These devices are all pivoted for individual free weighing movement on a common pivot rod 73 extending transversely of frame 50 and having its ends mounted in side supports 74. In the embodiment shown, each scale device comprises a pivotal beam 75 on the end of which is mounted an egg support in the form of a cup-like element 76, while three contact arms are spaced along the beam between its pivot and element 76. These contact arms are of different lengths, as shown in Figs. 7 and 9, reference numeral 77 indicating the shortest, 78 the one of intermediate length, and 79 the longest.

A bank of three vertically arranged microswitches 83, 84 and 85 is positioned below each scale beam 75 so that the operating arms 80, 81 and 82 are contacted serially by contact arms 77, 78 and 79, dependent on the amount of beam swing. These microswitches are mounted on a stepped bracket 86 which extends transversely of frame members 50. Extending transversely across the beams 75 of all the individual weight determining scale devices is a plate 87 which is supported at its ends by a pair of tension springs 88. Plate 87 has integral lugs 89 formed at each end by which it is guided for limited generally vertical movement in slots 90 in side plates 91, only one of which is shown (Fig. 7), there being an identical plate on the opposite side of frame member 50. An upwardly extending cam 92 is positioned medially on plate 87, and in vertical alignment each slat 59 carries a cam 93 adapted to coact with cam 92. Rearwardly of cam 92 and in alignment with cams 93 is a master microswitch 95, the operating arm 94 of which is depressed to switch-operating position by movement of cams 93 in the manner and at intervals hereinafter described.

As shown in Fig. 6, rearwardly of pivot rod 73 each scale beam 75 has a counterbalance arm 96 which has mounted thereon the counterbalance weight 97, the latter being slidable longitudinally of arm 96 for proper weighing adjustment of each scale device 72. Weight 97 is locked in desired position by a wing bolt 98 threaded through one side of the weight and gripping arm 96.

Below each beam is a normally open microswitch 100, the operating arm 99 of which is contacted by beam arm 96 when in its depressed positions, thereby closing the microswitch. The six microswitches 100 are mounted on a transverse support 101, an extension 102 of which carries the single master microswitch 95.

Figure 8:
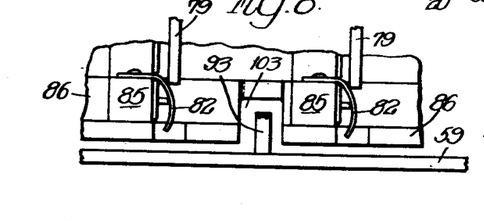
Fig. 8 is a fragmentary detail view, in section on line 8—8 of Fig. 7, illustrating the operating arms of typical light controlling microswitches and control elements for the same.

As shown in Fig. 8, the lowermost step of stepped bracket 86 is provided with an opening 103 to permit passage therethrough of cams 93 mounted on transverse slats 59.

Referring now to Figs. 5 and 7, light panel 46, which serves as the visual egg weight indication means, is supported above and transversely of frame 50 by bracket 104, this panel being provided with six sets of three vertically aligned openings. The numerals 105 indicate the topmost openings, 106 indicate the middle openings, and 107 the lowermost openings in each aligned set. Each opening is preferably covered by a light diffusing glass 108. Fastened to the rear of panel 46 is a plate 109 having apertures therein corresponding to and in register with the apertures 105, 106 and 107 to receive sockets 110 which carry lamps 112.

The egg conveyor mechanisms 20 utilize for their operations two major electric circuits, namely: (1) that having to do with the egg weight determining and indicating means; and (2) that having to do with the mechanism for advancing the slats 59 longitudinally of frame members 50. The last named circuit itself includes two subsidiary circuits which may be termed (a) the relay closing circuit, and (b) the relay opening circuit. However, all circuits are in a sense interrelated, as will be seen from the wiring diagram of Fig. 9 and the description which follows:

Referring to said wiring diagram, one side of the power supply line is connected through microswitch 95, which is normally closed, and through parallel circuits to each microswitch 83, 84 and 85, the last mentioned three switches being open in the inoperative condition of the weighing and indicating circuit of each individual weighing device, as shown. The microswitches 83, 84 and 85 are individually connected, respectively, to the lamps 112 at panel openings 105, 106, and 107, thence to the power line return.

Thus, when microswitch 95 is permitted to remain in its normally closed position, closure of the circuit of any microswitch 83 will cause its corresponding lamp 112 to light. Likewise, closure of the circuit of any microswitch 84 or 85 will cause its respective lamp to light. It will also be seen that, since above described circuits are in parallel, the lighting of corresponding lamps will be accomplished irrespective of the number of series into which the circuit as a whole may be multiplied, such as the series of six such interconnected circuits shown on the diagram. Also, coincident closure of circuits through microswitches 83 and 84 will simultaneously cause two corresponding lamps 112 to be lighted, and coincident closure of the circuits through microswitches 83, 84 and 85 will simultaneously cause the three corresponding lamps in each circuit to be lighted. Likewise, breaking the circuit at microswitch 95 will break the circuit to any and all lamps 112, irrespective of whether the circuits through any or all microswitches 83, 84 and 85 are closed.

The circuit illustrated in Fig. 9 includes an electrical relay 113 of the so-called "mechanically held" type including a magnetized head or armature. The relay is employed in the control circuit of the mechanism for advancing conveyor 20 at predetermined intervals, i. e., solenoid 68 and associated parts. Such control circuit includes a relay closing circuit, a solenoid energizing circuit, and a relay opening circuit, all cooperating to govern the actuation of solenoid 68.

Still referring to Fig. 9, in the relay closing circuit the power supply line is connected to relay 113 through the plurality of series connected, normally open microswitches 100. When all of these switches are closed, a circuit is completed to one side of relay 113, more particularly, to one contact 118 of a pair of spaced contacts 117, 118 adapted to be bridged by a buss bar 119 carried on the relay plunger 120. Buss bar 119 is mounted in insulated relation to the plunger 120 by the insulating material 121. The contact 117 is connected to a center tap 116 on the relay coil 115, the end tap 114 of this coil being brought back to the return side of the power supply line. The member 119 is normally in the position illustrated in Fig. 9, and when a circuit is completed through the microswitches 100, coil 115 is energized between the taps 116 and 114 and plunger 120 is elevated, immediately breaking the circuit at contacts 117, 118.

The relay plunger immediately shifts to a position wherein a circuit is completed through the further pair of contacts 122, 123 of relay 113, these contacts being bridged by a conductor bar 124 carried in insulated relation to the plunger 120. This is the relay opening circuit through the normally open switch 70 governed by solenoid 68. It includes a lead from the power supply line through the switch 70 and its arm 69, contact 122, conductor bar 124, contact 123, the entire length of coil 115, from an end tap 125 to end tap 114 thereof, thence to the return side of the power line.

Solenoid 68 is energized by a separate circuit, simultaneously with the shifting of plunger 120 referred to above, when the pair of spaced contacts 126, 127 carried by an insulating block 128 on the plunger come into engagement with the third pair of fixed contacts 131 and 132 of the relay. This completes a solenoid energizing circuit, including a lead connected to the power supply line, through contacts 127, 132, solenoid coil 130, contacts 131, 126, and a lead to the return line of the power supply. Energization of solenoid coil 130 through the circuit just described causes shifting of solenoid plunger 67 to the right as viewed in Fig. 4, which plunger, in completing its stroke, advances conveyor 20 one step. Plunger 67 as it approaches its limit of forward movement engages the movable arm 69 of switch 70, thereby closing the relay opening circuit through contacts 122 and 123. Reverse movement of relay plunger 120 breaks the relay circuit at these contacts.

The relay 113 is a standard Allen Bradley No. 700 A. C., mechanically held, solenoid type (Type BM100), including a closing spring, in which an auxiliary switch in the circuit of the closing coil is opened by the movable plunger. The arc formed by the auxiliary switch in opening interrupts the circuit at the instant of circuit magnetization of the plunger.

The operation of the several circuits will be described in greater detail hereinafter in connection with description of the mechanism to which they particularly relate.

The operation of the apparatus is as follows:

Operators remove eggs from egg-laden flats and fillers, using egg lifters of the type shown in U. S. Patent No. 2,092,847, issued September 14, 1937 to James A. Johnson. The eggs thus picked up are carried to loose egg loading stations D (see Figs. 1 and 2) and are placed on a series of the slats 59 forming the top surface of the several loose egg conveyor mechanisms 20, each egg occupying one opening 60 in one of the slats 59.

The operators also fill packaging material conveyor means 21 with appropriate quantities of set up egg cartons and a supply of fillers and flats from which eggs have been removed.

The egg packer preferably arranges one flat and filler on each of the several radially arranged hinged shelves 43, and also appropriately arranges such series of egg cartons as she may require within easy reach on shelves 47, 48 and 49.

When a supply of eggs has been placed on the upper flight of any loose egg conveyor mechanism 20 the circuits of such mechanism are closed thereby causing such mechanism to go into operation. As more fully explained hereinafter, the cup-like egg supports 76 are of smaller cross dimension than any opening 60 in any slat 59 and such egg supports are extensible a distance above the level of the slats when the conveyor flight formed by them is at rest. When the egg supports are not in egg supporting relation, egg supports 76 extend upwardly to their point of maximum extension permitting counterbeams 96 to depress and closingly contact operating arms 99 of microswitches 100, causing operation of the conveyor advance mechanism. Thus, in the absence of ability of egg support 76 to go into egg supporting relation to at least one egg in the endmost slot 59, the in-series circuit through all microswitches 100 will be closed immediately after the advance of each slat and the slats will be advanced step by step until at least one egg support carries one egg. At that time the conveyor will come to rest.

When conveyor 20 is at rest and one or more of the egg supports or cups 76 are in egg supporting position, it will be noted that (1) beam depressing bar 87 is out of contact with scale beams 75, being held in elevation thereabove by tension springs 88, with cam 92 positioned within an interstice between a pair of cams 93; (2) egg support 76 extends through openings 60; (3) at least one and possibly more contact arms (77, 78, 79) are in operative contact with one or possibly more operating levers (80, 81, 82) of microswitches 83, 84 and 85, thereby closing one or more of the light circuits shown in Fig. 9; (4) one cam 93 is in contact with but insufficiently advanced to impart operative movement to operating lever 94 of microswitch 95; and (5) each counterbeam 96 is elevated above and out of contact with operating lever 99 of each microswitch 100.

Assuming that the endmost slat 59 of conveyor mechanism 20 has carried six eggs forward to the position that all six scale beams 75 and their associated egg supporting elements 76 have gone into loaded, egg supporting position, all six elements 76 will extend above the level of endmost slat 59; however, being downwardly depressed somewhat from their maximum point of elevation depending on the weight of the egg on each egg supporting element 76. For instance, if a light egg is on one weighing device, the scale beam 75 will be depressed but slightly, in which case only contact arm 77 would come into contact with operating lever 80 of microswitch 83. In such case the electric circuit to one lamp 112 of the group of three of the same shown in Fig. 13 would be lighted. If a medium weight egg is on any egg support 76, its associated scale beam 75 would be sufficiently depressed so that contact arm 78, in addition to arm 77, will be brought into contact with operating lever 81 of microswitch 84, thereby completing the electric circuit to the middle lamp 112 in panel 46, there thus being two lights illuminated in the bank corresponding to that particular weighing device. If a heavy egg is positioned on a particular egg supporting element 76, its corresponding scale beam 75 will be depressed sufficiently to additionally permit contact arm 79 to engage operating lever 82 of microswitch 85, thereby closing the electric circuit to and lighting a third lamp 112 in the bank of lights corresponding to that particular scale device.

Thus, a glance at panel 46 tells the operator whether the egg on each egg supporting element is large, medium or small, depending upon the number of lights which are shown lighted in each bank of lights, each such bank being in alignment with its corresponding egg weighing device.

Removal of the egg from any egg support 76 for candling at light 45 permits scale beam 75 to rise to its highest level, carrying with it integral contact arms 77, 78 and 79, upon which all said contact arms raise out of engagement with any and all switch operating levers 80, 81 and 82, and any and all lamps 112 in the bank of lights corresponding to that scale device are extinguished. Also, counterbeam 96 swings into a lower position, contacting switch operating lever 99 of associated microswitch 100, thereby closing that portion of the relay closing circuit passing through that switch. So long as any one of the microswitches 100 is open, the relay circuit will be broken and the mechanism cannot be advanced.

Usually the egg packer will not remove eggs singly from egg supporting elements 76, but will pick up several at a time. The operator will then individually pass the eggs across the beam of candling light 45 to determine the internal quality thereof.

Assuming, for the purpose of illustration, that the clean, unchecked, edible eggs were being packed into grades of A large, A medium, A small, B large, and grade C (which latter grade would contain eggs of B medium and small grades as well as eggs actually grading C), the packer would have before her on shelf 47 five different types of egg cartons into which the cartonable eggs would be placed. Uncartonable eggs such as inedibles, dirties and checks would be placed in fillers and flats reposing on hinged shelves 43.

As stated hereinbefore, as the egg packer removes each egg of the series from the egg supporting element 76, each counterbeam 96 drops into contact with microswitch operating lever 99 of each microswitch 100. When all the eggs are removed from all the said elements 76 and all counterbeams 96 have depressed, the relay closing circuit will then be closed.

Completion of the relay closing circuit shown activates and magnetizes that portion of the coil 115 in relay 113 which lies between connections 114 and 116, and relay plunger 120 is thereby pulled forward so that solenoid plunger cross bar 124 is brought into electrical bridging and connecting relation across the gap between contacts 122 and 123. At the same time relay plunger block 128 is in position such that contacts 126 and 127 are brought into operative contact with contacts 131 and 132, thereby closing the electrical circuit to solenoid coil 130 of solenoid 68. Closure of the last above mentioned circuit activates and magnetizes solenoid coil 130, pulling forward solenoid plunger 67.

When solenoid plunger 67 is in its forwardmost position, it contacts and depresses the operating arm 69 of normally open microswitch 70, thereby completing the relay opening circuit. The closure of the relay opening circuit activates and magnetizes that entire portion of the relay coil 115 between connections 114 and 125, and relay solenoid plunger 120 is then withdrawn to assume the position shown in Fig. 9, thereby breaking the operating circuit of solenoid 68. The plunger of solenoid 68 then returns to its original unextended position under the pull of tension spring 71.

Figure 4:
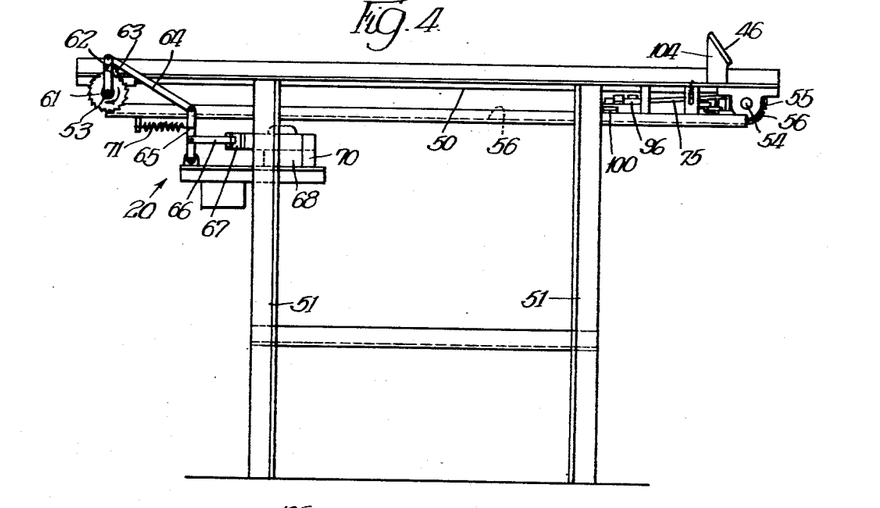
Fig. 4 is a side elevation of said conveyor.

As will be seen in Fig. 4, forward movement of mechanism operating solenoid plunger 67 causes forward movement of spring loaded pawl 63. Forward movement of the latter causes the ratchet wheel 61 to be partially rotated in the direction indicated on the drawings, carrying with it in such rotation shaft 53 and sprocket wheels 55. The latter are drivingly associated with parallel endless chains 56 affixed to slats 59, so that forward movement is thus imparted to the series of such slats as a unit.

The mechanism through which the solenoid advances the conveyor is geared to provide one and three-quarters inches movement during each cycle or step of operation. The slats 59 are one and three-quarters inches in width, so each activation of the solenoid advances the conveyor 20 just the right amount to present a new row of eggs in predetermined position before the candler and in register with the weighing devices 76.

Referring now to Fig. 6, during the forward movement of the slats 59, one of the cams 93 is brought into edge-to-edge contact with cam 92 on weighing device depressing bar 87, thereby depressing the same. Bar 87 is thus brought into contact with all beams 75 of all weighing devices 72, depressing the same to such an extent that all egg supports 76 are withdrawn out of openings 60 and sufficiently below slats 59 to be entirely out of the path of travel of slats 59 as they are advanced.

It will be noted that during the time scale beams 75 are depressed by bar 87, all the contact arms 77, 78 and 79 are in engagement, respectively, with operating arms 80, 81 and 82 of microswitches 83, 84 and 85. Under these circumstances all the light circuits shown in Fig. 13 will be closed, and normally all lamps 112 would be lighted. To overcome this possible objection, in the advancing movement of slats 59, one of the cams 93, other than the cam which caused depression of transverse bar 87, contacts arm 94 of microswitch 95, thereby opening this normally closed switch. As shown in Fig. 9, switch 95 is in a controlling position with respect to all the light circuits shown, hence, the above described action temporarily breaks the circuit to all the weight indicating lights 112, extinguishing them until the mechanism has come to rest at the weighing position.

When the upper conveyor flight of loose egg conveyor mechanism has completed one step of advance, the transversely extending scale beam depressing bar 87 is returned to normal elevated position by tension springs 88, cam 92 on said bar assuming a position in an interstice between a pair of cams 93. Coincidentally, all scale beams 75 elevate counterclockwise under gravity to permit egg supports 76 to extend through openings 60 and go into egg supporting relationship to the eggs newly brought forward therein. When egg supports 76 are in egg supporting relation, the entire loose egg conveyor mechanism is at rest and will not again go into advancing operation until all the eggs are removed from the egg supports 76. When this is accomplished an automatic repetition of its advancing operation will be instituted. Also the weight of any egg will continue to be shown on panel 46 until the egg is removed from egg support 76, at which time a further supply is advanced before the operator in the manner hereinbefore indicated.

The egg packer at station E continues to remove eggs from egg supports 76, determines their internal quality under the beam of candling light 45, and places the egg either in fillers and flats (inedibles, dirties and checks) or in appropriate egg cartons in accordance with their weight and internal quality as hereinbefore indicated.

When a filler and flat assembly positioned on hinged shelf 43 has been completely filled with eggs, the operator tips the shelf upwardly to the level of annular conveyor 24 and shoves the flat and filler assembly thereon. When any egg carton is filled, the operator shoves it onto rotating annular conveyor 25, the top of the carton being unclosed and extending upwardly, and the longitudinal dimension of the carton extending in the direction of rotation of said conveyor 25. The cover may thereafter be closed automatically as the carton travels on the last named conveyor.

I claim:

1. In egg handling machinery, a frame, an endless conveyor traveling orbitally on the frame, means to impart intermittent movement to said conveyor, said conveyor having rows of longitudinally aligned article-receiving elements which are advanced step by step in said intermittent movement, a plurality of counterbalance scales traversed by said elements, each engageable with an article on one of said elements during halting of the conveyor and variably movable thereby in accordance with the article weight, and means controlled by said scales to visually indicate the weight of the articles.

2. In egg handling machinery, a frame, an endless conveyor traveling orbitally on the frame, means to impart intermittent movement to said conveyor, said conveyor having rows of longitudinally aligned article-receiving elements which are advanced step by step in said intermittent movement, a plurality of scales traversed by said elements, each engageable with an article on one of said elements during halting of the conveyor and variably movable thereby in accordance with the article weight, means controlled by said scales to visually indicate the weight of the articles, and means actuating said first named means to move said conveyor only when a row of said elements is empty.

3. In egg handling machinery, a frame, intermittently movable conveyor means carried by the frame, comprising a plurality of slats in side by side alignment longitudinally of the frame, each slat being provided with a plurality of transversely aligned, spaced egg receiving openings, the openings in the respective slats being in equidistantly spaced relationship, means for determining the weight of each egg in each opening, comprising scale means having an arm extensible in the immobile position of the conveyor into supporting relationship with the egg whereby the weight of each egg may be determined, means responsive to said scale means to visuually indicate the weight of each egg, and means associated with the scale means to cause the conveyor to be advanced the width of a single slat subsequent to removal of a predetermined number of eggs from the slat.

4. An egg handling apparatus comprising a conveyor for advancing a row of eggs, a plurality of egg weighing devices positioned adjacent said row of eggs, there being weighing devices for separately weighing all eggs in said row simultaneously, means for intermittently advancing said conveyor for the weighing operation, and means controlling said last named means to cause said conveyor to advance another row of eggs only when the last egg of the weighed row has been removed.

5. In an egg handling mechanism, an intermittently movable conveyor comprising a plurality of aligned slats each having at least one egg receiving receptacle associated therewith, a beam type scale having an article supporting element on its beam which is operative when the conveyor is immobile to determine the weight of each egg, means for indicating the weight of each egg, means for advancing the conveyor a distance equivalent to the width of a single slat when the egg is removed from the article supporting element of the scale, and means for removing said element from the path of travel of the conveyor during the advance of the latter.

6. Egg handling apparatus, comprising means to advance eggs in step-by-step sequence from a loading station to an unloading station, a weighing device adjacent said unloading station, means to bring said weighing device into egg supporting relation during the halting of said first means whereby the weight of the eggs may be determined, means coacting with the weighing device to indicate the weight of each egg, and means operable only on removal of the last egg from the weighing device to cause the first named means to advance a predetermined amount.

7. Egg handling apparatus, comprising means to advance eggs from a loading station to an unloading station, a weighing device adjacent said unloading station, means to bring said weighing device into egg supporting relation whereby the weight of the eggs may be determined; and means operable only on removal of the last egg from the weighing device to cause the first named means to advance a predetermined quantity of eggs.

8. In article advance mechanism, a frame, a conveyor comprising a plurality of article receiving slats extending transversely of the frame and movable unidirectionally longitudinally thereof, each slat having a plurality of article holding means associated therewith, each adapted to hold a single article, and means for advancing the conveyor a predetermined segment thereof in response to removal from the slats of a predetermined number of articles, said last named means comprising a plurality of transversely spaced members movable in response to absence of articles at said respective article holding means.

9. In article advance mechanism for eggs, a frame, a conveyor movable generally unidirectionally within the frame, said conveyor comprising a plurality of slats arranged side by side and extending transversely of the frame, said slats having a plurality of aligned article supporting elements associated therewith, each element adapted to hold a single article, and means for advancing the conveyor a distance equivalent to the width of a single slat in response to removal from a certain slat of the last article thereon, said last named means comprising a plurality of transversely spaced members movable in response to absence of articles at said respective article holding elements.

10. In mechanism for advancing eggs to a station where they are removed from the mechanism, a conveyor supporting frame, an endless conveyor comprising a plurality of side-by-side slats extending transversely of the conveyor, each slat being provided with a plurality of article receiving openings therein, each of said openings adapted to receive a single article, and means for advancing the conveyor a distance equivalent to the width of a single slat in response to the removal from a predetermined slat of the last egg thereon, said last named means comprising a plurality of transversely spaced members movable in response to absence of articles at said respective article receiving openings.

11. In article conveying mechanism, a frame, an endless conveyor carried by the frame, means to advance the conveyor intermittently and unidirectionally of the frame, said conveyor comprising a plurality of laterally aligned slats extending transversely of the frame, each provided with a plurality of aligned article supporting openings therein in equispaced relation, individual control elements associated with said openings and separately movable, as determined by the presence or absence of an article therein, for putting into operation said conveyor advancing means upon removal from the slats of a predetermined number of articles, said advancing means including means for advancing the conveyor a predetermined distance upon actuation of the control means.

12. In egg handling apparatus, a bulk egg advance mechanism comprising an endless conveyor having transversely arranged slats adapted to hold rows of eggs and advance such rows in step-by-step fashion to a candling station, a row at a time; means causing continuous step-by-step advance of the conveyor until an egg carrying slat has reached a predetermined position; means for halting the conveyor when an egg carrying slat has reached the predetermined position; and means preventing further advance of the conveyor until the last egg in the predetermined position has been removed therefrom; said first means thereafter permitting further advance of the conveyor until an egg carrying slat is brought forward into predetermined position, and comprising transversely spaced members each movable in response to absence of one of a plurality of eggs on that slat.

13. In egg handling machinery, a frame, intermittently operable conveyor means carried by the frame, comprising a plurality of slats in side-by-side alignment, each slat having a plurality of transversely aligned egg receiving openings, such openings being in equidistantly spaced relationship, means for determining the weight of each egg in each opening, comprising scale means having an arm extensible in the resting position of the conveyor into supporting relation with the egg, and means responsive to said scale means to indicate the weight of each egg.

14. Egg advance mechanism, comprising a unidirectionally movable endless conveyor formed of cross-pieces having six egg receiving elements associated therewith, the egg receiving elements being spaced throughout the top conveyor flight to coincide with the position of eggs packed in conventional egg case fillers, and means controlled by the absence of eggs in said elements for automatically advancing the conveyor the width of a single cross-piece at a time under predetermined circumstances, said last named means comprising a plurality of transversely spaced members movable in response to absence of articles at said respective egg receiving elements.

15. Egg advance mechanism, comprising an orbitally traveling endless conveyor formed of a plurality of slats extending crosswise of the conveyor frame, each of said slats having six aligned egg pocketing openings formed therein, the openings being spaced throughout the conveyor to coincide with the spacing of eggs in a conventional egg case filler, and means for advancing the conveyor step-by-step the width of a single slat at each advance thereof, said means comprising six elements extensible during the immobile position of the conveyor through the openings in a predetermined slat into supporting relation to eggs brought forward in the openings of said slat, any of said elements preventing further advance of the conveyor while supporting an egg and all of said elements cooperating to initiate advance of the conveyor when in non-egg-supporting position.

16. An article grading mechanism comprising a conveyor, electrically energizable means for intermittently advancing successive rows of articles on said conveyor, an individual grading device for each of said articles in a row adapted to assume grading engagement therewith during a pause in the intermittent advance thereof, an electrically energizable indicating device, and an electrical control circuit for said mechanism comprising an operating circuit for said conveyor advancing means, a holding circuit including a plurality of series-connected switches operable by said grading devices and a control unit connected to said holding circuit and operatively connected to said operating circuit to maintain energization thereof only in the absence of a row of articles on said conveyor, and an energizing circuit for said indicating device including contacts engageable individually by said grading devices.

17. An article grading mechanism comprising a conveyor, electrically energizable means for intermittently advancing successive rows of articles on said conveyor, an individual grading device for each of said articles in a row adapted to assume grading engagement therewith during a pause in the intermittent advance thereof, an electrically energizable indicating device, and an electrical control circuit for said mechanism comprising an operating circuit for said conveyor advancing means, a holding circuit including a plurality of series-connected switches operable by said grading devices and a control unit connected to said holding circuit and operatively connected to said operating circuit to maintain energization thereof only in the absence of a row of articles on said conveyor, an energizing circuit for said indicating device including contacts engageable individually by said grading devices, and a master switch governing the flow of current through said contacts.

18. An article advancing mechanism of the type described, comprising a traveling article conveyor having means to transport articles in rows extending transversely of its path of travel, and apparatus to control intermittent advance of articles by the same, whereby articles in different rows are halted at a forward transverse stop zone and at stop zones located successively to the rear thereof along the path of conveyor travel, said apparatus comprising means normally acting to halt articles of a row at said forward zone and including a device movably operated in response to the absence of an article at said forward zone, and control means operatively connected to and positively actuated by said device upon movement thereof to cause the device to advance an article toward the forward zone from a zone to the rear thereof, said device comprising a plurality of transversely spaced members each movable in response to absence of an article, whereby said device actuates said control means when all articles are removed from a row at said forward zone.

19. An article advancing mechanism in accordance with claim 18 in which the row transporting means of said conveyor comprises an endless conveyor unit having transversely extending slat-like supporting members secured thereto in longitudinal succession.

20. An article advancing mechanism in accordance with claim 18 in which the row transporting means of said conveyor comprises an endless conveyor unit having transversely extending slat-like supporting members secured thereto in longitudinal succession, each of said members having a plurality of article receiving seats spaced lengthwise thereof.

References Cited in the file of this patent

UNITED STATES PATENTS

| Number | Name | Date |
|---|---|---|
| 713,775 | Kuehnrich | Nov. 18, 1902 |
| 1,355,488 | McKenney | Oct. 12, 1920 |
| 1,492,178 | Nicholas | Apr. 29, 1924 |
| 1,829,035 | Besal | Oct. 27, 1931 |
| 1,930,621 | Meyer | Oct. 17, 1933 |
| 2,279,041 | Hadley | Apr. 7, 1942 |
| 2,347,068 | Sneed | Apr. 18, 1944 |